(12) United States Patent
Akahane

(10) Patent No.: US 8,547,585 B2
(45) Date of Patent: *Oct. 1, 2013

(54) APPARATUS, PROGRAM, AND METHOD FOR HIGH SPEED IMAGE READING USING A SHEET FEEDING DEVICE

(75) Inventor: Takuya Akahane, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 740 days.

This patent is subject to a terminal disclaimer.

(21) Appl. No.: 12/632,698

(22) Filed: Dec. 7, 2009

(65) Prior Publication Data

US 2010/0141999 A1   Jun. 10, 2010

(30) Foreign Application Priority Data

Dec. 10, 2008 (JP) .................. 2008-314086

(51) Int. Cl.
*G06K 15/00* (2006.01)
*H04N 1/04* (2006.01)

(52) U.S. Cl.
USPC .......................... 358/1.16; 358/474

(58) Field of Classification Search
USPC ............... 358/1.1, 1.8, 1.9, 1.13, 1.14, 1.15, 358/400, 404, 464, 474, 486, 500
See application file for complete search history.

(56) References Cited

U.S. PATENT DOCUMENTS

| | | |
|---|---|---|
| 5,220,437 A | 6/1993 | Saegusa et al. |
| 6,851,609 B2 | 2/2005 | Ando et al. |
| 7,301,680 B1 | 11/2007 | Jones |
| 8,040,577 B2 | 10/2011 | Akiyama |
| 8,253,988 B2 | 8/2012 | Inukai |
| 2004/0125416 A1* | 7/2004 | Gawlik et al. ................ 358/474 |
| 2008/0117481 A1* | 5/2008 | Akiyama ....................... 358/488 |
| 2008/0180699 A1* | 7/2008 | Selvaraj ........................ 358/1.1 |
| 2009/0066988 A1 | 3/2009 | Imaizumi |
| 2011/0242611 A1 | 10/2011 | Nozaki |
| 2011/0242620 A1 | 10/2011 | Yamamoto |

FOREIGN PATENT DOCUMENTS

| | | |
|---|---|---|
| JP | 02-306764 A | 12/1990 |
| JP | 03-219764 A | 9/1991 |
| JP | 10-051599 A | 2/1998 |
| JP | 2001-111794 A | 4/2001 |
| JP | 2002-016769 A | 1/2002 |
| JP | 2002-135531 A | 5/2002 |
| JP | 2002-204339 A | 7/2002 |
| JP | 2002-281256 A | 9/2002 |
| JP | 2006-020084 A | 1/2006 |

* cited by examiner

*Primary Examiner* — Gabriel Garcia
(74) *Attorney, Agent, or Firm* — Kilpatrick Townsend & Stockton LLP

(57) ABSTRACT

An image reading apparatus includes: a sheet feeding device; a sheet feeding control section that controls transport of an original document performed by the sheet feeding device; a reading section that reads the original document so as to output image data; a reading control section that allows the reading section to perform the reading by repeatedly outputting a reading signal to the reading section; a buffer that temporarily stores the image data; and a monitoring section that monitors a volume of the image data stored in the buffer. When the monitoring section determines that the volume of the image data is less than a predetermined first threshold value, the sheet feeding control section accelerates the transport of the original document and maintains the transport at a predetermined speed, and the reading control section starts the output of the reading signal when the transport of the original document is started.

3 Claims, 8 Drawing Sheets

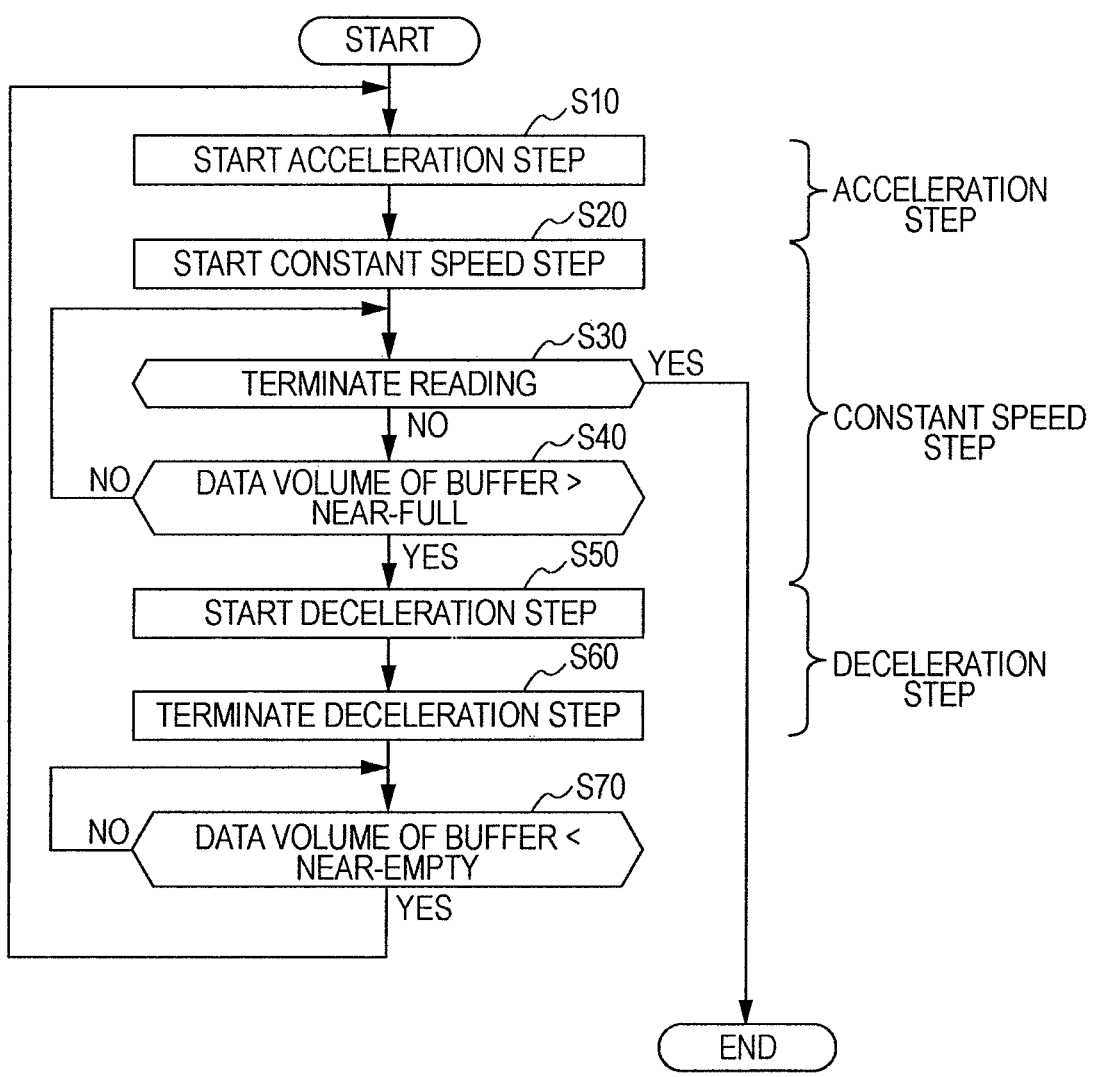

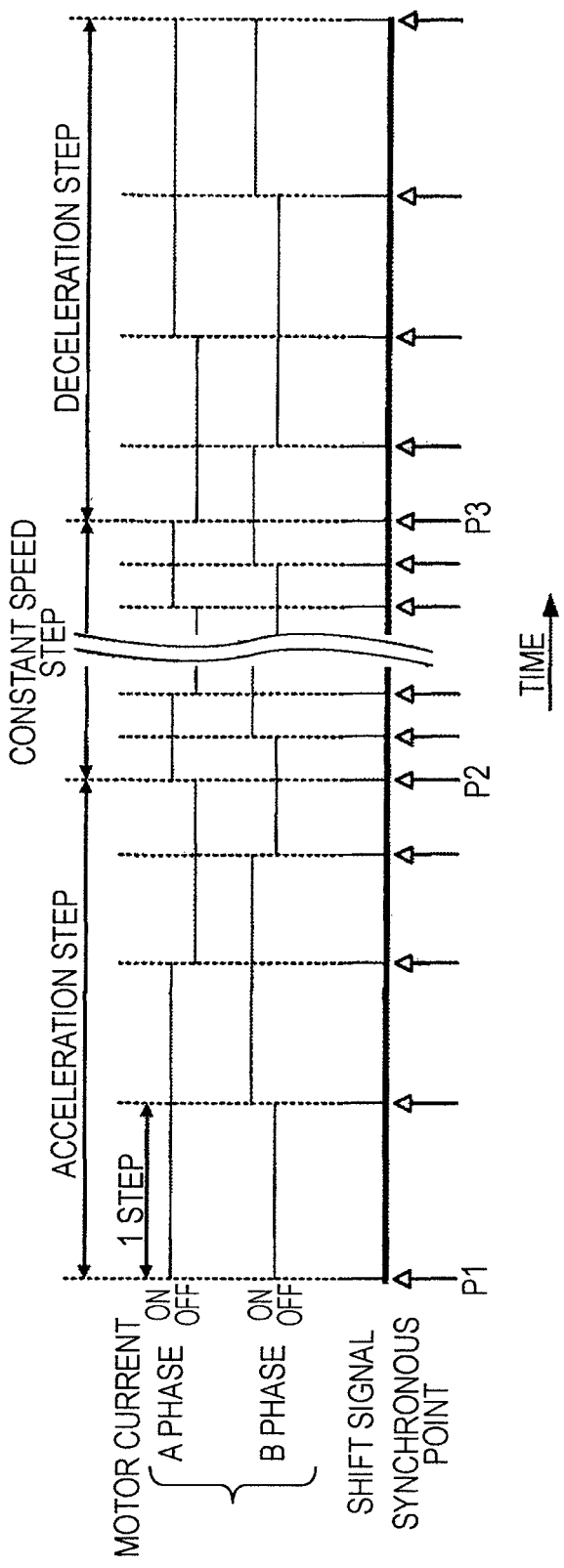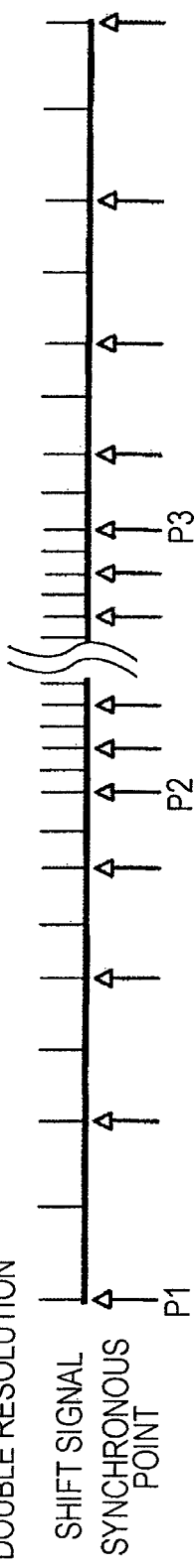

ORIGINAL DOCUMENT IMAGE
MOVING DIRECTION OF ORIGINAL DOCUMENT

IMAGE READING PROCESS
ACCELERATION STEP
CONSTANT SPEED STEP
DECELERATION STEP

OUTPUT IMAGE

ORIGINAL DOCUMENT IMAGE

MOVING DIRECTION OF ORIGINAL DOCUMENT

IMAGE READING PROCESS

ACCELERATION STEP
CONSTANT SPEED STEP
DECELERATION STEP

OUTPUT IMAGE

APPARATUS, PROGRAM, AND METHOD FOR HIGH SPEED IMAGE READING USING A SHEET FEEDING DEVICE

This application claims priority to Japanese Patent Application No. 2008-314086, filed Dec. 10, 2008 the entirety of which is incorporated by reference herein.

BACKGROUND

1. Technical Field

The present invention relates to an image reading technique using an ADF (Auto Document Feeder) function.

2. Related Art

Image scanners (image reading apparatuses) are known which have the ADF (Auto Document Feeder) function. In such scanners, the entire image of the original document is read by a stationary image sensor while the original document is moved at a constant speed (for example, JP-A-2006-20084).

The image scanners temporarily store the read image data in a buffer, and sequentially transmit the data to a host such as a personal computer (PC). The transmission speed is determined in accordance with processing capability of the host computer. Hence, the reading speed of the image scanner is adjusted to a low speed which does not result in the buffer being filled up.

However, there is a demand for an increase in reading speed, but if the reading speed is high, the buffer tends to fill up. In this point, when the buffer is nearly full, a method can be considered in which the sheet feeding of the original document is temporarily stopped.

However, when a sheet feeding roller of a sheet feeding device is driven at a speed above a predetermined speed, sudden stopping may not be possible in terms of mechanical structure. Thus, a deceleration step is required. Further, when the sheet feeding roller of the sheet feeding device is driven at the speed above the predetermined speed, it may not be possible in terms of mechanical structure to suddenly drive the roller at high speed. Thus, an acceleration step is required.

In existing image scanners, the acceleration step and the deceleration step are not considered. If the acceleration step and the deceleration step are provided, distortions occur in the read image.

SUMMARY

An advantage of some aspects of the invention is that it provides a technique that enables feasible high speed reading with a simple configuration in image reading apparatuses including a sheet feeding device.

According to a first aspect of the invention, an image reading apparatus includes: a sheet feeding device; a sheet feeding control section that controls transport of an original document performed by the sheet feeding device; a reading section that reads the original document so as to output image data; a reading control section that allows the reading section to perform reading by repeatedly outputting a reading signal to the reading section; a buffer that temporarily stores the image data; and a monitoring section that monitors the volume of the image data stored in the buffer. When the monitoring section determines that the volume of the image data is less than a predetermined first threshold value, the sheet feeding control section accelerates the transport of the original document and maintains the transport at a predetermined speed, and the reading control section starts the output of the reading signal when the transport of the original document is started. When the monitoring section determines that the volume of the image data is more than a predetermined second threshold value, the sheet feeding control section decelerates and stops the transport of the original document, the reading control section stops the output of the reading signal when the transport of the original document is stopped, and the reading control section outputs the reading signal for each given transport distance of the original document while the original document is transported.

In the image reading apparatus according to the first aspect of the invention, it is preferred that the sheet feeding device should have a stepping motor. In addition, it is also preferred that the sheet feeding control section controls the transport of the original document by changing a control of a current applied to the stepping motor for each step. In addition, it is also preferred that the reading control section synchronize output timing of the reading signal with changeover timing of the control of the current.

In the image reading apparatus according to the first aspect of the invention, it is preferred that the sheet feeding device have a stepping motor. In addition, it is also preferred that the sheet feeding control section should control the transport of the original document by changing a control of a current applied to the stepping motor for each step. In addition, it is also preferred that the reading control section should output the reading signal at preset time intervals while the original document is transported, and synchronizes output timing of the reading signal with changeover timing of the control of the current in each initial step of an acceleration period, a period of predetermined speed, and a deceleration period of the transport of the original document.

According to a second aspect of the invention, provided is an image reading method for an image reading apparatus which has a sheet feeding device for transporting an original document, an image sensor for receiving the reading signal and reading the original document, and a buffer for temporarily storing image data of the read original document. The image reading method includes: determining whether or not the volume of the image data stored in the buffer is less than a predetermined first threshold value; determining whether or not the volume of the image data stored in the buffer is more than a predetermined second threshold value; and reading the original document by accelerating the transport of the original document and maintaining the transport at a predetermined speed, and starting the output of the reading signal after the starting of the transport of the original document, when the volume of the image data is less than the first threshold value, and by decelerating and stopping the transport of the original document, and stopping the output of the reading signal along with the stopping of the transport of the original document, when the volume of the image data is more than the second threshold value. In the reading of the original document, the reading signal is output for each given transport distance of the original document while the original document is being transported.

According to a third aspect of the invention, provided is a program for causing an image reading apparatus, which has a sheet feeding device for transporting an original document, an image sensor for reading the original document by receiving the reading signal, and a buffer for temporarily storing image data of the read original document, to perform an image reading process. The program causes the image reading apparatus to execute: determining whether or not a volume of the image data stored in the buffer is less than a predetermined first threshold value; determining whether or not a volume of the image data stored in the buffer is more than a predetermined second threshold value; and reading the original document by accelerating the transport of the original document and maintaining the transport at a predetermined speed, and starting the output of the reading signal after the starting of the transport of the original document, when the volume of the image data is less than the first threshold value, and by decelerating and stopping the transport of the original document, and stopping the output of the reading signal along with the stopping of the transport of the original document, when the volume of the image data is more than the second threshold value. In the reading of the original document, the reading signal is output for each given transport distance of the original document while the original document is transported.

BRIEF DESCRIPTION OF THE DRAWINGS

The invention will be described with reference to the accompanying drawings, wherein like numbers reference like elements.

FIG. 4 is a flowchart of an image reading process of the image scanner.

FIGS. 5A and 5B are diagrams illustrating the relationship between steps and shift signals.

DESCRIPTION OF EXEMPLARY EMBODIMENTS

Hereinafter, an embodiment of the invention will be described.

Figure 1:
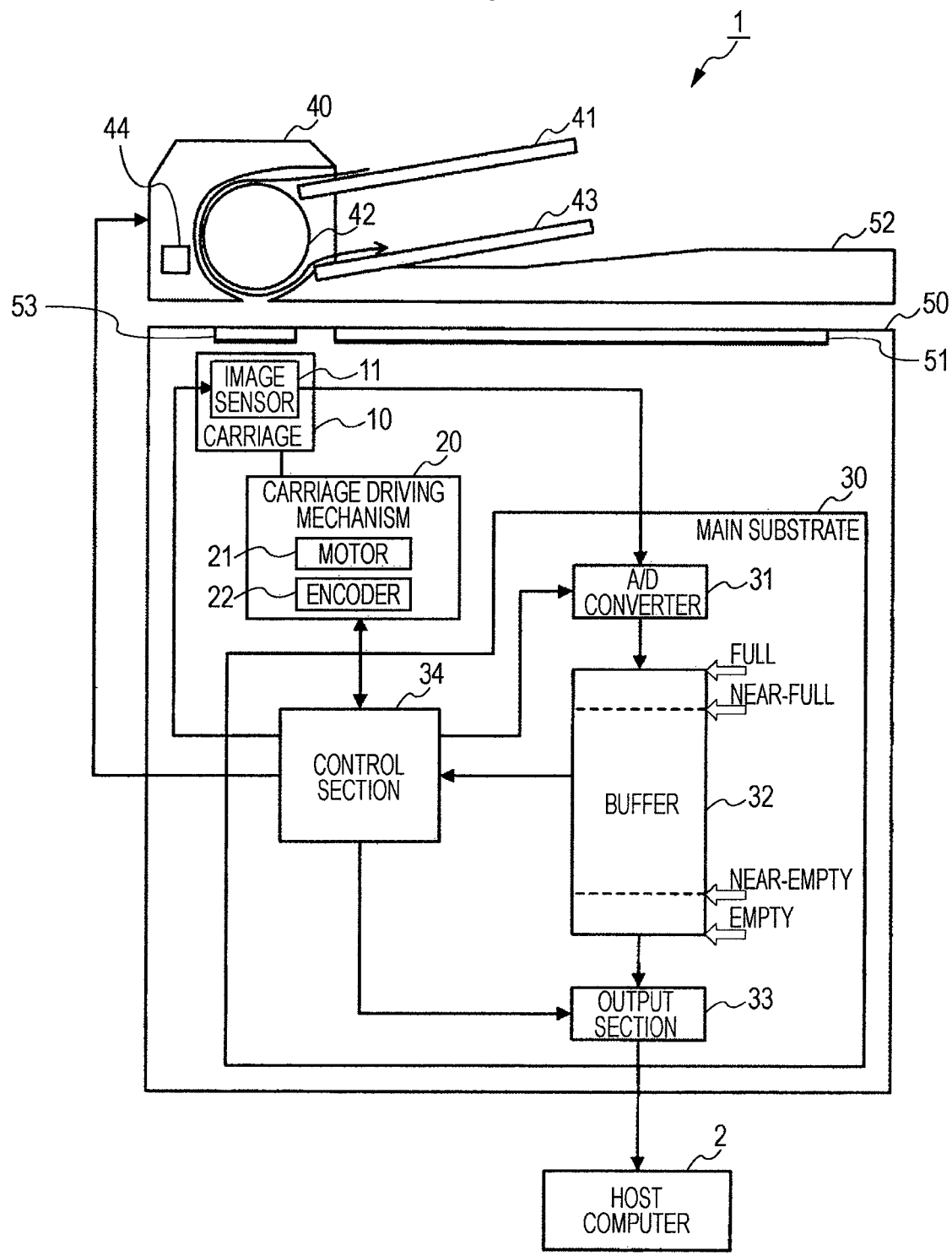
FIG. 1 is a diagram illustrating a schematic configuration of an image scanner of an image reading apparatus according to an embodiment of the invention.

FIG. 1 shows a schematic configuration diagram of an image scanner 1 which is an example of an image reading apparatus according to the embodiment of the invention.

The image scanner 1 is a so-called flat bed type image scanner having a platen formed on an upper surface of a casing. The image scanner 1 reads an image by irradiating light onto the original document, which is fixed on the platen with a transparent plate, from the below and scanning it with the image sensor 11.

The image scanner 1 includes a upward platen 50 on which the original document which is a target reading medium is placed, a original document placing surface (a board surface) 51 of the platen 50, and a cover 52 for covering an image reading window 53 from above. The cover 52 is combined with the platen 50 through a hinge tool, and is openable.

A sheet feeding device (ADF) 40 is provided integrally with the cover 52 on the left side of the board surface 51 in the drawing (the upstream side in a flow direction of the original document), that is, on the upper side of the image reading window 53. The sheet feeding device 40 has a sheet feeding tray 41, a transport roller (a sheet feeding roller) 42, a sheet discharging tray 43, a driving motor (a stepping motor) 44. The rotation of the transport roller 42 is controlled by the driving motor 44. The sheet feeding device 40 sends the original document placed on the sheet feeding tray 41 to the upper surface of the image reading window 53, and makes it pass the upper surface.

The image scanner 1 includes, below the platen 50, a carriage (referred to as "CR") 10 which is equipped with the CCD color image sensor 11, a carriage driving mechanism 20 which controls reciprocation of the carriage 10, and a main substrate 30 which controls the entire system of the image scanner 1.

The carriage 10 transports the image sensor 11 in a sub-scanning direction. The carriage 10 is slidably mounted on a guiding shaft and the like parallel to the board surface 51 and the image reading window 53 of the platen 50. The carriage 10 is pulled by a belt which is rotated by the motor 21 of the carriage driving mechanism 20, and is reciprocated. When reading is performed while the original document is transported by the sheet feeding device 40, the carriage 10 is fixed at a predetermined position below the image reading window 53.

The carriage driving mechanism 20 includes a motor 21 for rotating the belt mounted on the carriage 10 and an encoder 22 for outputting pulses in accordance with the amount of rotation of the motor 21.

The main substrate 30 has an A/D converter 31, a buffer 32, an output section 33, and a control section 34.

The A/D converter 31 converts an analog signal from the image sensor 11 to a digital signal.

The buffer 32 temporarily stores data output from the A/D converter 31, and sends the data to the output section 33 in order, from the data stored first, in a first-in first-out FIFO mode. When the volume of the stored data is more than a predetermined data volume (a near-full value), then the buffer 32 starts receiving the data which is read in the deceleration step of the driving motor 44 of the sheet feeding device 40. When the deceleration step is terminated, the buffer 32 stops receiving the data. Then, the buffer 32 only transmits the data to the output section 33 and does not receive the next data until the volume of the stored data is less than a predetermined data volume (a near-empty value).

The near-full value and the near-empty value which are values relating to the data volume of the buffer 32, are described herein.

In the embodiment, even during the deceleration step of the driving motor 44, read data is transmitted to the buffer 32. Even after the deceleration step is terminated and the instruction to stop the reading operation is issued from the control section 34 to the image sensor 11, the data which is read already is transmitted to the buffer 32. The near-full value is defined as a maximum limit of the data volume where the buffer 32 is capable of receiving data, which is read in the deceleration step, and the data, which is being transmitted after the stopping of the reading, without becoming full. The near-full value is adjusted to the volume of the data which is read in the deceleration step.

On the other hand, even after the instruction to restart reading is issued, it takes time for the read data to reach the buffer 32. Accordingly, when the buffer is set to be completely empty, the data sent to the host computer 2 is discontinued, thereby lowering throughput. The near-empty value is a minimum limit of the data volume which is set so there is no discontinuation in the data.

The output section 33 sends the data from the buffer 32 to the host computer 2 (a scanner control device) such as the personal computer at a transmission speed depending on the processing capability of the host.

Figures 2, 3:
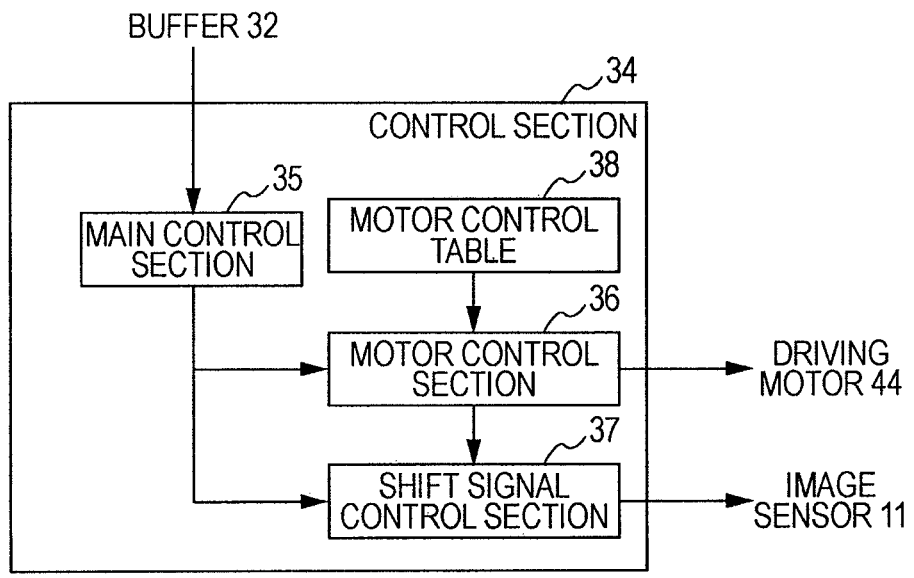
FIG. 2 is a diagram illustrating a schematic configuration of a control section of the image scanner.
FIG. 3 is a diagram illustrating an exemplary composition of a motor control table.

The control section 34 controls the sheet feeding device 40, the carriage driving mechanism 20, and the image sensor 11. FIG. 2 is a diagram illustrating a schematic configuration of the control section 34. As shown in FIG. 2, the control section 34 includes a main control section 35, a motor control section 36, a shift signal control section 37, and a motor control table 38.

The main control section 35 monitors the data volume of the buffer 32. When the data volume is less than a predetermined near-empty value, the main control section 35 issues instruction to start the acceleration step of the reading operation of the original document, to the motor control section 36 and the shift signal control section 37. Further, when the data volume is larger than a predetermined near-full value, the main control section 35 issues instruction to start the deceleration step of the reading operation of the original document to the motor control section 36 and the shift signal control section 37.

The motor control section 36 controls the driving motor 44 of the transport roller 42, and transports the original document of the sheet feeding tray 41 to the right side of the drawing (the downstream side in the flow direction of the original document), thereby making the original document pass the image reading window 53. Specifically, when receiving the instruction to start the acceleration step of the reading operation of the original document from the main control section 35, the motor control section 36 accelerates the transport of the original document. When the speed of the transport reaches a predetermined speed (a constant speed), the motor control section 36 continues the transport at the predetermined speed. When receiving the instruction to start the deceleration step of the reading operation of the original document from the main control section 35, the motor control section 36 decelerates the transport of the original document and, after a while, stops the transport.

Here, in order to rotate the driving motor 44 at a high speed, the motor control section 36 performs the control of the acceleration step for reaching the constant speed, the control of the constant speed step, and the control of the deceleration step for decelerating from the constant speed until stopping. Hence, the motor control section 36 uses a table. The related table (a motor control table 38) will be described.

FIG. 3 is a diagram illustrating an exemplary composition of the motor control table 38. As shown in FIG. 3, the motor control table 38 stores a plurality of entries relating to motor step numbers 381 and timing information 382. The motor control table 38 includes entries for controlling the acceleration step of the driving motor 44, entries for controlling the constant speed step, and entries for controlling the deceleration step.

The motor step numbers 381 are information for specifying the respective steps of the driving motor 44. The timing information 382 is information representing the time required for the respective steps of the driving motor 44. For example, the driving motor 44 may be a two phase type stepping motor formed of two coils. In this case, the rotation of the motor is controlled by changing ON/OFF of a current in both of the phases or any one of them on the basis of predetermined rules. That is, the timing information 382 represents the time during which the ON/OFF control of the current in each step is continued. The motor control section 36 is able to detect the timing for changing the ON/OFF control of the current in each step by using the timing information 382.

For example, in the timing information 382 of each of the entries (S1 to S3) in the acceleration step, the time of the next step is set to be shorter than the previous step. In the constant speed step, the control times of the respective steps are the same. Therefore, one entry (S4) is provided. In the timing information 382 of each of the entries (S5 to S7) of the deceleration step, the time of the next step is set to be longer than the previous step.

It is apparent that the number of entries of the acceleration step and the deceleration step is just one example. That is, the number of entries is previously adjusted in accordance with the mechanical structure of the driving motor 44. Further, the composition of the motor control table 38 is not limited to the above-mentioned description. For example, different motor control tables 38 can be provided for a plurality of high speed modes of which the maximum speeds are different.

The motor control section 36 controls the rotation of the driving motor 44 (the acceleration step, the constant speed step, and the deceleration step) by changing the ON/OFF control of the current on the basis of the predetermined rules, whenever the time denoted in the timing information 382 of each step has elapsed, by sequentially referring to the entries in the motor control table 38. Furthermore, the motor control section 36 has, for example, a timer module, and detects the elapsing of time by using the timer module.

The motor control section 36 outputs the timing signal representing the corresponding timing to the shift signal control section 37 when starting each step of the driving motor 44.

The shift signal control section 37 controls the starting and the stopping of the image reading operation of the image sensor 11. Specifically, the shift signal control section 37 receives the timing signal which output by the motor control section 36, and outputs the shift signal (the reading instruction) to the image sensor 11 when having received the timing signal. That is, the shift signal control section 37 outputs the shift signal in synchronization with the changeover timing of the ON/OFF control of the current of the driving motor 44 due to the motor control section 36 while the original document is being transported (during the acceleration step, the constant speed step, and the deceleration step).

Here, the distance of transport of the original document is constant in one step of the driving motor 44. Hence, in the acceleration step, the time required for the transport of the original document corresponding to the one step is shorter in accordance with the acceleration of the driving motor 44. In the deceleration step, the time required for the transport of the original document corresponding to one step is longer in accordance with the deceleration of the driving motor 44. Therefore, as described above, during the transport of the original document, the shift signal control section 37 outputs the shift signal to the image sensor 11 when starting each step. Thereby, the number of the reading operations performed by the image sensor 11 is made to be constant relative to the transport distance of the original document corresponding to one step, and the intervals between the reading operations are made to be the same transport distance. As a result, it is possible to eliminate distortions in the read image.

The control section 34 may be formed as a computer with a CPU which is a control device, a ROM in which programs are recorded, and a RAM which is a main memory for temporarily storing data and the like. It is apparent that the control section 34 may be formed as an ASIC (Application Specific Integrated Circuit) designed to perform processing only.

As described above, the schematic configuration of the image scanner 1 has been described. However, the description shows a principal configuration for explaining characteristics of the embodiment of the invention but the other configurations of general image scanners may be also allowed.

Next, the characteristic operations of the image scanner 1 configured as described above will be described.

FIG. 4 is a flowchart of an image reading process of the image scanner 1. The flow shows the case of reading of one page of image data. When receiving a request to read the original document from a user, the main control section 35 issues the instruction to start the acceleration step of the reading operation of the original document to the motor control section 36 and the shift signal control section 37, and starts the flow.

First, in S10, the acceleration step of the driving motor 44 is started.

Specifically, the motor control section 36 controls the acceleration step of the driving motor 44 by sequentially referring to the entries of the acceleration step in the motor control table 38. That is, the motor control section 36 starts the ON/OFF control of the current based on the predetermined rules at the start of each step of the acceleration step, and outputs the timing signal to the shift signal control section 37. Further, the motor control section 36 starts the next step when the time denoted in the timing information 382 of the entry corresponding to the step has elapsed since the start of the step. On the other hand, the shift signal control section 37 outputs the shift signal to the image sensor 11 when having received the timing signal from the motor control section 36.

In this manner, the acceleration step is terminated (S10), and subsequently the constant speed step of the driving motor 44 is started (S20).

Specifically, the motor control section 36 controls the constant speed step of the driving motor 44 by referring to the entry of the constant speed step in the motor control table 38. That is, the motor control section 36 starts the ON/OFF control of the current based on the predetermined rules at the start of each step of the constant speed step, and outputs the timing signal to the shift signal control section 37. Further, the motor control section 36 starts the next step when the time denoted in the timing information 382 of the entry corresponding to the step has elapsed since the start of the step. On the other hand, the shift signal control section 37 outputs the shift signal to the image sensor 11 when having received the timing signal from the motor control section 36.

After the start of the constant speed step, the main control section 35 determines whether or not the reading of the image corresponding to one page is terminated (S30). If the reading is not terminated (S30: NO), the process proceeds to S40. In contrast, if the reading is terminated (S30: YES), the current flow is terminated.

In S40, the main control section 35 monitors whether or not the data volume of the buffer 32 is more than the predetermined near-full value. If the data volume is not more than the near-full value (S40: NO), the process returns to S30. In contrast, if the data volume is more than the near-full value (S40: YES), the instruction to start the deceleration step of the reading operation of the original document is issued to the motor control section 36 and the shift signal control section 37, and the process proceeds to S50.

In S50, the deceleration step of the driving motor 44 is started.

Specifically, the motor control section 36 controls the deceleration step of the driving motor 44 by referring to the entries of the deceleration step in the motor control table 38. That is, the motor control section 36 starts the ON/OFF control of the current based on the predetermined rules at the start of each step of the deceleration step, and outputs the timing signal to the shift signal control section 37. Further, the motor control section 36 starts the next step when the time denoted in the timing information 382 of the entry corresponding to the step has elapsed since the start of the step. On the other hand, the shift signal control section 37 outputs the shift signal to the image sensor 11 when having received the timing signal from the motor control section 36.

After the elapse of the time denoted in the timing information 382 of the last entry of the deceleration step, the motor control section 36 stops the driving motor 44 (S60). The shift signal control section 37 terminates the reading operation of the image sensor 11. Then, the process proceeds to S70.

When stopping reading of the original document, the main control section 35 monitors whether or not the data volume of the buffer 32 is less than the predetermined near-empty value (S70). If the data volume is not less than the near-empty value (S70: NO), the monitoring is continued. In contrast, if the data volume is less than the near-empty value (S70: YES), the instruction to start the acceleration step of the reading operation of the original document is issued to the motor control section 36 and the shift signal control section 37, and the process returns to S10.

As described above, the higher speed image reading is performed without resulting in distortions in the read image.

As shown in FIG. 5A, in the acceleration step, the constant speed step, and the deceleration step, the shift signal is output to the image sensor 11 in synchronization with the start of each step of the driving motor 44. That is, the shift signal is output to the image sensor 11 so as to make the number of the reading operations performed by the image sensor 11 constant relative to the transport distance of the original document corresponding to one step and make the intervals between the reading operations be the same transport distance.

Figure 6A:
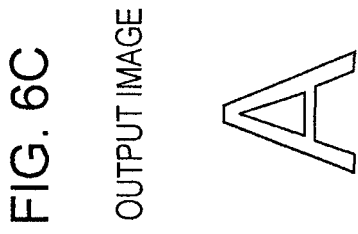
FIGS. 6A, 6B, and 6C are diagrams illustrating an image which is read from an original document.
Figure 6B:
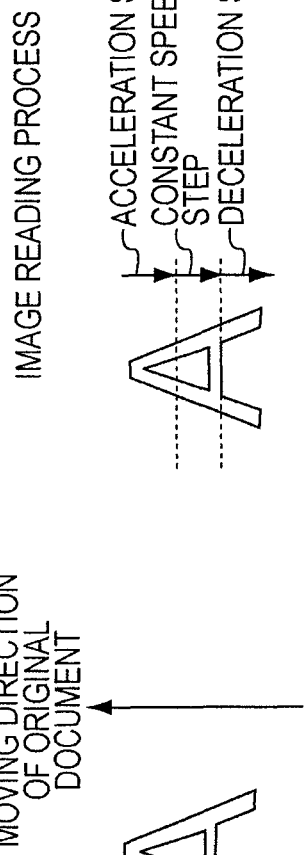
Figure 6C:
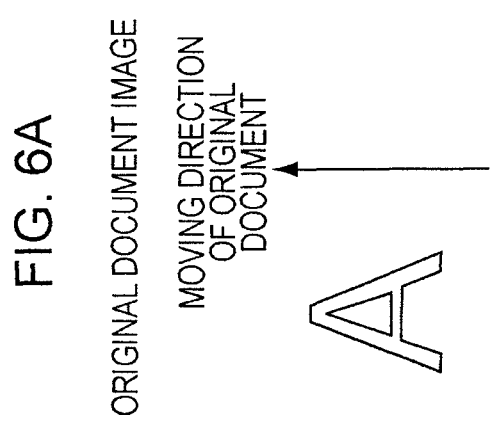

By adopting such a configuration, for example, the original image of FIG. 6A is read without distortions in the reading ranges of the acceleration and deceleration steps in the image reading process of FIG. 6B, thereby obtaining the output image of FIG. 6C.

The reading operation can be performed not only in the constant speed step but also in the acceleration step and the deceleration step. Hence, as compared with the case where the reading operation is not performed in the acceleration step and the deceleration step, the speed of the image reading corresponding to one page increases.

To clarify advantages of the configuration of the image scanner 1 according to the embodiment, the image scanner, which does not perform the reading operation in the acceleration step and the deceleration step, is described herein.

Figure 8:
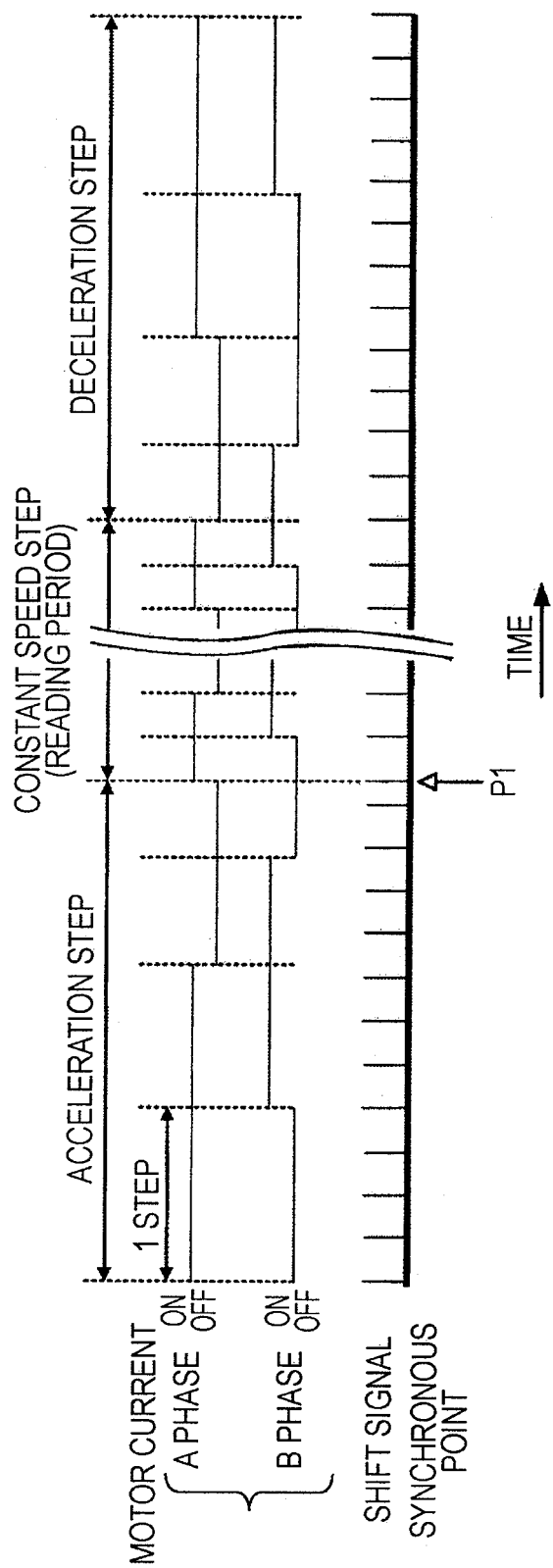
FIG. 8 is a diagram illustrating the relationship between steps and shift signals in an example which has no characteristics of the embodiment of the invention.

In such an image scanner, for example, as shown in FIG. 8, the first shift signal is output to the image sensor 11 in synchronization with the start of the first step of the driving motor 44 in the constant speed step (P1). After the second step, the shift signals are output with the same time interval. Here, it is assumed that the reading operation is performed in the acceleration step and the deceleration step. Then, since the time interval of the output shift signal is constant, the number of the reading operations performed by the image sensor 11 varies with the elapsing of time, relative to the transport distance of the original document corresponding to one step, in the acceleration step and the deceleration step. As a result, distortions occur in the image read in the acceleration step and the deceleration step.

Figure 9A:
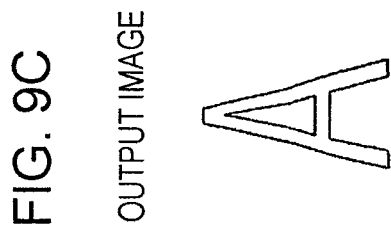
FIGS. 9A, 9B, and 9C are diagrams illustrating an image which is read from an original document in the example which has no characteristics of the embodiment of the invention.
Figure 9B:
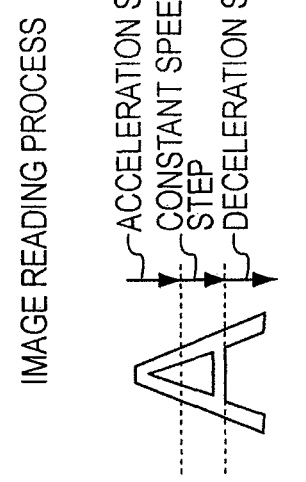

For example, the original image of FIG. 9A is not correctly read in the reading range of the acceleration step and the deceleration step in the image reading process of FIG. 9B.

Figure 9C:
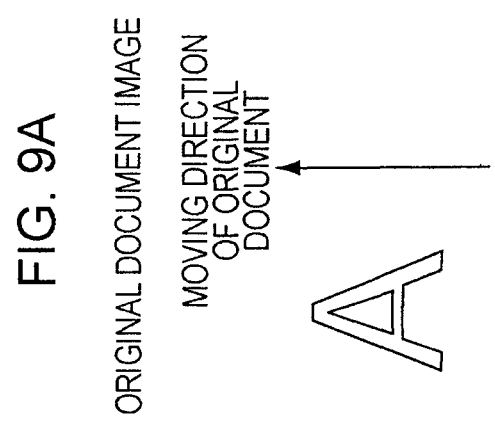

Accordingly, like the output image of FIG. 9C, distortions occur in the reading ranges of the acceleration step and the deceleration step.

The embodiment of the invention has been hitherto described. According to the embodiment, it is possible to perform feasible high speed reading with the simple configuration in the image reading apparatuses including the sheet feeding device.

The above-mentioned embodiment of the invention intends to exemplify the outline and the scope of the invention, and does not limit the invention. It will be readily apparent to those skilled in the art that various modifications, derivations and variations can be made.

MODIFIED EXAMPLE 1

Figure 7:
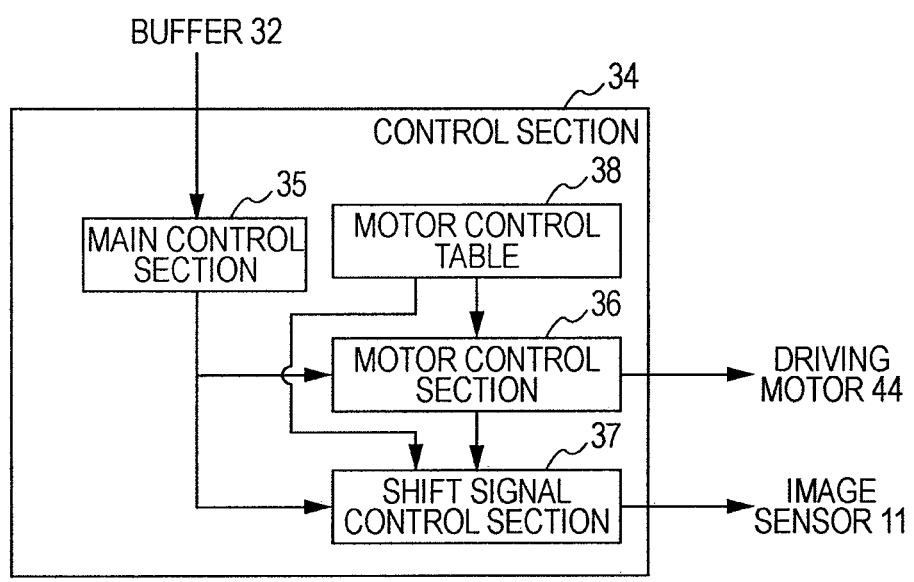
FIG. 7 is a diagram illustrating a schematic configuration of the control section of the image scanner according to a modified example 1.

In the embodiment mentioned above, the shift signal is output in synchronization with the start of each step of the driving motor 44. However, only the first step of each period of the acceleration step, the constant speed step, and the deceleration step may be synchronized. Specifically, description will be given focusing on differences from the embodiment with reference to FIG. 7.

In the same manner as the embodiment, the motor control section 36 controls the rotation of the driving motor 44 (the acceleration step, the constant speed step, and the deceleration step) by changing the ON/OFF control of the current on the basis of the predetermined rules, for each step, by sequentially referring to the entries in the motor control table 38.

The motor control section 36 outputs the timing signal representing the corresponding timing to the shift signal control section 37 only at the time (P1, P2, and P3 of FIG. 5A) of the start of each first step in each period of the acceleration step, the constant speed step, and the deceleration step.

The shift signal control section 37 outputs the shift signal to the image sensor 11 whenever the time denoted in the timing information 382 of each step elapses by sequentially referring to the entries in the motor control table 38. Furthermore, the shift signal control section 37 has, for example, the timer module, and detects the elapsing of time by using the timer module.

The shift signal control section 37 receives the signal representing the timing from the motor control section 36, and outputs the shift signal in synchronization with the timing signal, in each first step of each period of the acceleration step, the constant speed step, and the deceleration step. Then, the shift signal control section 37 controls the output of the shift signal by sequentially referring to the entries in the motor control table 38, in the steps other than each first step of each period of the acceleration step, the constant speed step, and the deceleration step. That is, the shift signal control section 37 corrects the output timing of the shift signal in the first steps of the acceleration step, the constant speed step, and the deceleration step.

MODIFIED EXAMPLE 2

In the embodiment mentioned above, reading is performed at a fixed reading resolution, but the reading resolution may be set to be changeable.

Specifically, the shift signal control section 37 measures the predetermined time, which depends on the reading resolution, from the receiving of the timing signal which is output by the motor control section 36. The shift signal control section 37 has, for example, a timer module, and detects the elapsing of time by using the timer module. Then, when the elapsing of the predetermined time is detected, the shift signal is output to the image sensor 11. That is, the shift signal is output to the image sensor 11 not only when the timing signal is received but also during the time interval from the reception of the timing signal to reception of the timing signal of the next step.

For example, when the reading is performed by setting the reading resolution to be double, the shift signal control section 37 receives the timing signal, and then measures half the time required for one step in the process. Then, when detecting the elapse of this time, the shift signal control section 37 outputs the shift signal to the image sensor 11 (refer to FIG. 5B).

It is apparent that the above-mentioned configuration may be applied to Modified Example 1.

By adopting such a configuration, even when the resolution is increased, each shift signal is output at the correct time in each of the acceleration step, constant speed step, and deceleration step. In addition, distortions do not occur in the read image.

OTHER MODIFIED EXAMPLES

For example, an encoder, which outputs a pulse in response to the rotation amount of the transport roller 42, may be provided in the sheet feeding device 40, and the shift signal control section 37 may output the shift signal for each given distance by calculating the moving distance of the original document on the basis of the pulse. In such a manner, the shift signal control section 37 is able to output the shift signal for each one step of the acceleration step, the constant speed step, and the deceleration step with a simpler configuration. In this case, the driving motor 44 of the sheet feeding device 40 is not limited to the stepping motor, and may use, for example, a DC motor and the like.

When reading is successively performed on a plurality of pages, the process of the flow of FIG. 4 may be repeated for each one page. In addition, when reading is successively performed on the plurality of pages, the process of the flow of FIG. 4 may be repeated for each one page until the reading of the previous page is terminated by determining whether or not reading of the previous page is terminated in S30 of FIG. 4.

The invention may be applicable to copiers, multi-functional printers, and the like each having an image scanner.

What is claimed is:

1. An image reading apparatus comprising:
   a sheet feeding device;
   a sheet feeding control section that controls transport of an original document performed by the sheet feeding device;
   a reading section that reads the original document so as to output image data;
   a reading control section that allows the reading section to perform the reading by repeatedly outputting a reading signal to the reading section;
   a buffer that temporarily stores the image data; and
   a monitoring section that monitors a volume of the image data stored in the buffer,
      wherein when the monitoring section determines that the volume of the image data is less than a predetermined first threshold value, the sheet feeding control section accelerates the transport of the original document and maintains the transport at a predetermined speed, and the reading control section starts the output of the reading signal when the transport of the original document is started,
      wherein when the monitoring section determines that the volume of the image data is more than a predetermined second threshold value, the sheet feeding control section decelerates and stops the transport of the original document, the reading control section stops the output of the reading signal when the transport of the original document is stopped, and the reading control section outputs the reading signal for each given transport distance of the original document while the original document is transported, wherein the sheet feeding device has a stepping motor, wherein the sheet feeding control section controls the transport of the original document by changing a control of current applied to the stepping motor for each step, and wherein the reading control section outputs the reading signal at preset time intervals while the original document is transported, and synchronizes output timing of the reading signal with changeover timing of the control of the current in each initial step of an acceleration period, a period of the predetermined speed, and a deceleration period of the transport of the original document.

2. An image reading method for an image reading apparatus which has a sheet feeding device for transporting an original document, a sheet feeding device control module for controlling transportation of the original document using a control signal, an image sensor for receiving a reading signal and reading the original document, and a buffer for temporarily storing image data of the read original document, the image reading method comprising:

determining whether or not a volume of the image data stored in the buffer is less than a predetermined first threshold value;

determining whether or not a volume of the image data stored in the buffer is more than a predetermined second threshold value; and reading the original document by accelerating the transport of the original document and maintaining the transport at a predetermined speed, and starting the output of the reading signal after the starting of the transport of the original document, when the volume of the image data is less than the first threshold value, and by decelerating and stopping the transport of the original document, and stopping the output of the reading signal along with the stopping of the transport of the original document, when the volume of the image data is more than the second threshold value, wherein in the reading of the original document, the reading signal is output for each given transport distance of the original document while the original document is transported, and wherein output timing of the reading signal is synchronized with changeover timing of the control signal in an acceleration period, a predetermined speed period, and a deceleration period.

3. A non-transitory computer-readable medium, having a program for causing an image reading apparatus, which has a sheet feeding device for transporting an original document, a sheet feeding device control module for controlling transportation of the original document using a control signal, an image sensor for reading the original document by receiving a reading signal, and a buffer for temporarily storing image data of the read original document, to perform an image reading process, the program causing the image reading apparatus to execute a method comprising:

determining whether or not a volume of the image data stored in the buffer is less than a predetermined first threshold value;

determining whether or not a volume of the image data stored in the buffer is more than a predetermined second threshold value; and reading the original document by accelerating the transport of the original document and maintaining the transport at a predetermined speed, and starting the output of the reading signal after the starting of the transport of the original document, when the volume of the image data is less than the first threshold value, and by decelerating and stopping the transport of the original document, and stopping the output of the reading signal along with the stopping of the transport of the original document, when the volume of the image data is more than the second threshold value, wherein in the reading of the original document, the reading signal is output for each given transport distance of the original document while the original document is transported, and wherein output timing of the reading signal is synchronized with changeover timing of the control signal in an acceleration period, a predetermined speed period, and a deceleration period.

* * * * *